United States Patent
Greenberg et al.

(10) Patent No.: US 6,996,715 B2
(45) Date of Patent: Feb. 7, 2006

(54) METHOD FOR IDENTIFICATION OF A USER'S UNIQUE IDENTIFIER WITHOUT STORING THE IDENTIFIER AT THE IDENTIFICATION SITE

(75) Inventors: Eric Greenberg, McLean, VA (US); Braddock Gaskill, Baltimore, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 910 days.

(21) Appl. No.: 10/038,147

(22) Filed: Jan. 3, 2002

(65) Prior Publication Data

US 2003/0126436 A1 Jul. 3, 2003

(51) Int. Cl.
*H04L 9/00* (2006.01)
(52) U.S. Cl. .................... 713/168; 713/169; 713/170; 713/171
(58) Field of Classification Search ............. 713/168, 713/169, 170, 171; 380/258
See application file for complete search history.

(56) References Cited

U.S. PATENT DOCUMENTS

| | | | | |
|---|---|---|---|---|
| 5,937,066 A | * | 8/1999 | Gennaro et al. | 380/286 |
| 6,064,736 A | * | 5/2000 | Davis et al. | 713/155 |
| 6,584,564 B2 | * | 6/2003 | Olkin et al. | 713/152 |

FOREIGN PATENT DOCUMENTS

EP 849713 A1 * 6/1998

* cited by examiner

*Primary Examiner*—Gregory Morse
*Assistant Examiner*—Aubrey Berger
(74) *Attorney, Agent, or Firm*—Duane Morris LLP

(57) ABSTRACT

A method for authenticating and logging-in a first user of a communication system to a second user is performed using hashing operations in such a manner that the first user's unique identifier is not stored on the first user's computer, and the second user's computer does not store information which allows a hacker gaining access thereto to assume the identity of the first user.

4 Claims, 3 Drawing Sheets

METHOD FOR IDENTIFICATION OF A USER'S UNIQUE IDENTIFIER WITHOUT STORING THE IDENTIFIER AT THE IDENTIFICATION SITE

FIELD OF THE INVENTION

This invention relates to identity authentication in a communications system or network context, and more particularly to the use of a method involving hashing to allow identification of users without requiring storage of the user's unique identifier at the identification site.

BACKGROUND OF THE INVENTION

Some current arrangements for verification of user identity in a communication system are susceptible to compromise in the event of hacking. For example, if a user makes a purchase from an on-line retailer, the user's name and password, or possibly his credit card number or other important data, is stored by the retailer at the retailer's computer or server. It is a fact that such online computers or servers may be penetrated by hackers or malfeasors. Once penetrated, the user's name and password, credit-card number or other data may be accessed by the hacker, and possibly misused. Firewalls are used with computers and servers in an attempt to avoid having a server penetrated. However, firewalls are not perfect, and it is not clear that conventional methods for protecting such data are effective. The only way to be sure that important information is not compromised is to avoid placing it on a server connected to a communications system.

In general, cryptography does not solve the problem of penetration of the user's server or computer, although it may be useful for protection of the data while it is in transit. Even for that use, however, public-key cryptography may not be as useful as it seems, as it tends to be somewhat difficult to use, because both the public and private keys tend to be very large numbers which cannot be remembered by the users, and therefore require storage on a separate module such as a floppy disk. Thus, existing protections against loss of identity information to a successful hacker may not be as effective as it might be.

Additional protection is desired for information stored on a communications server or computer.

SUMMARY OF THE INVENTION

A method according to an aspect of the invention provides for identification between or among at least first and second users communicating by means of a communication system or network. The method includes the step of providing a first unique identifier from the first user to the second user. This unique identifier may be a user name and password, or it may be any alphanumeric which the first user selects or adopts. At least the first and second users enter into an agreement as to a plurality of hash or hashing salts. In one embodiment of the invention, the agreement provides for five hash salts. There need not be an explicit agreement on the hash salts, as software which each of the parties uses to implement the invention may be preprogrammed with specific salts, or with some way to reach agreement. However determined, at least five salts are agreed to between or among the parties, as well as the type or types of hash operations to be used. At the second user, a hash operation is performed on one of (a) the first unique identifier and (b) an agreed-upon deterministic transformation of the first unique identifier, using the first (A) salt from the plurality of salts which was agreed to, to thereby produce a first (A) data hash. Data hashing is a well-known technique, and any conventional hashing technique can be used. In this context, a deterministic transformation includes a defined subset of the unique identifier, or the result of application of the unique identifier to some defined equation; ultimately, the only requirement is that each of the first and second users must be able to perform the same operation to reach the same result. At the second user, a hash operation is performed on the unique identifier, or its transformation, using the fifth (E) of the hash salts, to thereby produce a fifth (E) data hash. At the second user, a hash operation is performed on at least a portion of the first (A) data hash using the second (B) of the plurality of hash salts, to thereby produce a second (B) data hash. The second user proceeds to perform a hash operation on at least a portion of the first (A) data hash, using the third (C) of the plurality of hash salts, to thereby produce a third (C) data hash. At the second user, a hash operation is performed on at least a portion of the third (C) data hash using the fourth (D) of the plurality of hash salts, to thereby produce a fourth (D) data hash. At the second user, the third (C) data hash is discarded. Data hashes B and D are stored in memory at the second user's location or site, at addresses pointed to by hash E. At this point in the operation, the second user has in its memory data hashes B and D, but hash E is not explicitly stored. The second user may also store the various salts, and the types of hashing operations. Ideally, the second user also discards the unique identifier (UI). This completes the initial authentication process, where, or in which, the first user identifies himself to the second user, so that the second user can later recognize the first user at the later actual log-in to the second user. The later log-in includes, at the first user, performing a hash operation, using the fifth one (E) of the plurality of hash salts, on at least a portion of one of (a) the first unique identifier and (b) data deterministically derived from the unique identifier, to thereby produce (a replica of) the fifth (E) data hash; this step may be performed as part of the initial authentication or as part of each log-in. To start the first log-in, the first user keys in his unique identifier, which as mentioned may be a user name and password. The first user uses salt E to perform a hash operation on the unique identifier or its derivative (if not already performed), to thereby produce data hash E. Data hash E is transmitted to the second user. It should be noted that it is not possible to determine the unique identifier from only hash salt E and data hash E. The second user, when it receives data hash E, acts on it as initiating a log-in and accesses its memory at the locations specified by data hash C, to recover data hashes B and D, which are associated with the first user. The second user then generates a random number, and encrypts the random number in any conventional way with a key deterministically derived from data hash B. The encrypted random number is sent over the communication path or network to challenge the first user. The first user then proves that he is in possession of data hash B by decrypting the encrypted random number using its own copy (or reconstruction) of hash B, to thereby form an extracted random number. Having the random number, then, proves that the user attempting to log on has data hash B, which only the original entity (user A) which authenticated itself can have. Data hash C is transmitted from the first user to the second user together with the extracted random number for authentication of data hash C. The second user compares the original random number with the returned random number, and deems the transmission authentic if they match. At this point, the second user once again has possession of data hash C, as well as data hashes B and D. The second user then performs a hash operation on the third (C) data hash using the fourth (D) hash salt, which generates a sixth (F) data hash, which should be equal or identical to the fourth (D) data hash if all goes well. Naturally, if there is any deviation among the various numbers, the third (C) and sixth (F) data hashes will not be the same as during the initial authentication. The second user then compares the fourth (D) and sixth (F) data hashes, to determine if they are equal. If they are equal, the second user deems the message to be from the first user, and enables the connection or communication between the users in any conventional manner. The second user then discards the third (C) data hash, so that it cannot be compromised.

In one variant of the method of the invention, after the steps at said second user of (a) performing a hash operation on one of (a) the first unique identifier (UI) and (b) an agreed-upon deterministic transformation of the first unique identifier, using the first (A) salt, to thereby produce a first (A) data hash and (b) performing a hash operation on the unique identifier, or its transformation, using the fifth (E) of the hash salts, to thereby produce a fifth (E) data hash, a further step of discarding the first unique identifier is performed at the second user.

DESCRIPTION OF THE INVENTION

Figure 1:
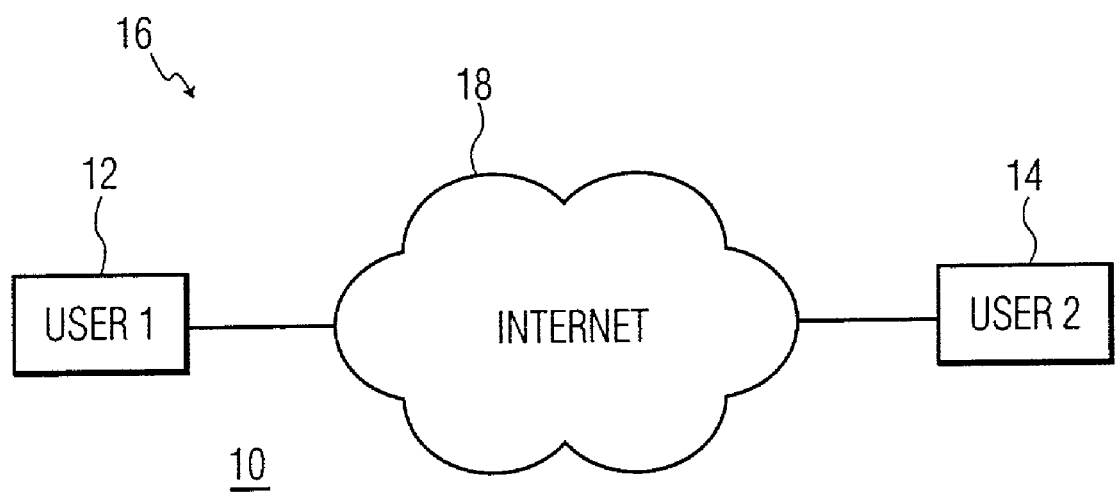
FIG. 1 is a simplified block diagram of a network with plural users, where the plurality is two.

FIG. 1 is a simplified block diagram of a system 10 including a first user's computer or server 12, which communicates with a second user's computer or server 14 by way of a communication or transmission path 16, which in this case includes the Internet 18. If the first user 12 is a purchaser, and user 14 is a retailer, some information relating to the first user 12 must be stored at the second user's location 14. For example, such information might be a user name and password, or it might be some other private data (any of which is termed a "unique identifier" herein). If a hacker can penetrate the second user's computer 14, he may undesirably be able to access the private data and cause mischief, such as assumption of the first user's identity to the second user, in this example the retailer. Typically, the retailer will store the user name and password in the server, and compare the user name and password of someone accessing his site with the stored name and password. This is ordinarily done by using the user's name as a pointer to a memory, in which the password is stored. If the proffered user name points to a memory location at which a password is stored which is the same as the proffered password, the user is deemed to be verified. If the hacker were able to obtain the user name and password from the second user's site, it would then be possible for the hacker to contact the retailer's computer 14 using that user name and password, and pass himself off as the user of computer 12. It will be recognized that the first and second users can have any relationship, and are not limited to purchaser and retailer.

According to an aspect of the invention, the user's name and password, or his other unique identifier (UI), is processed by hashing the unique identifier, and by storing only some of the resulting hashed data. Hashing is well known in the art, and many algorithms are available, any of which can be used, including Sha and MD5. In a particular embodiment of the invention, the selected hashing was MD5.

Figure 2A:
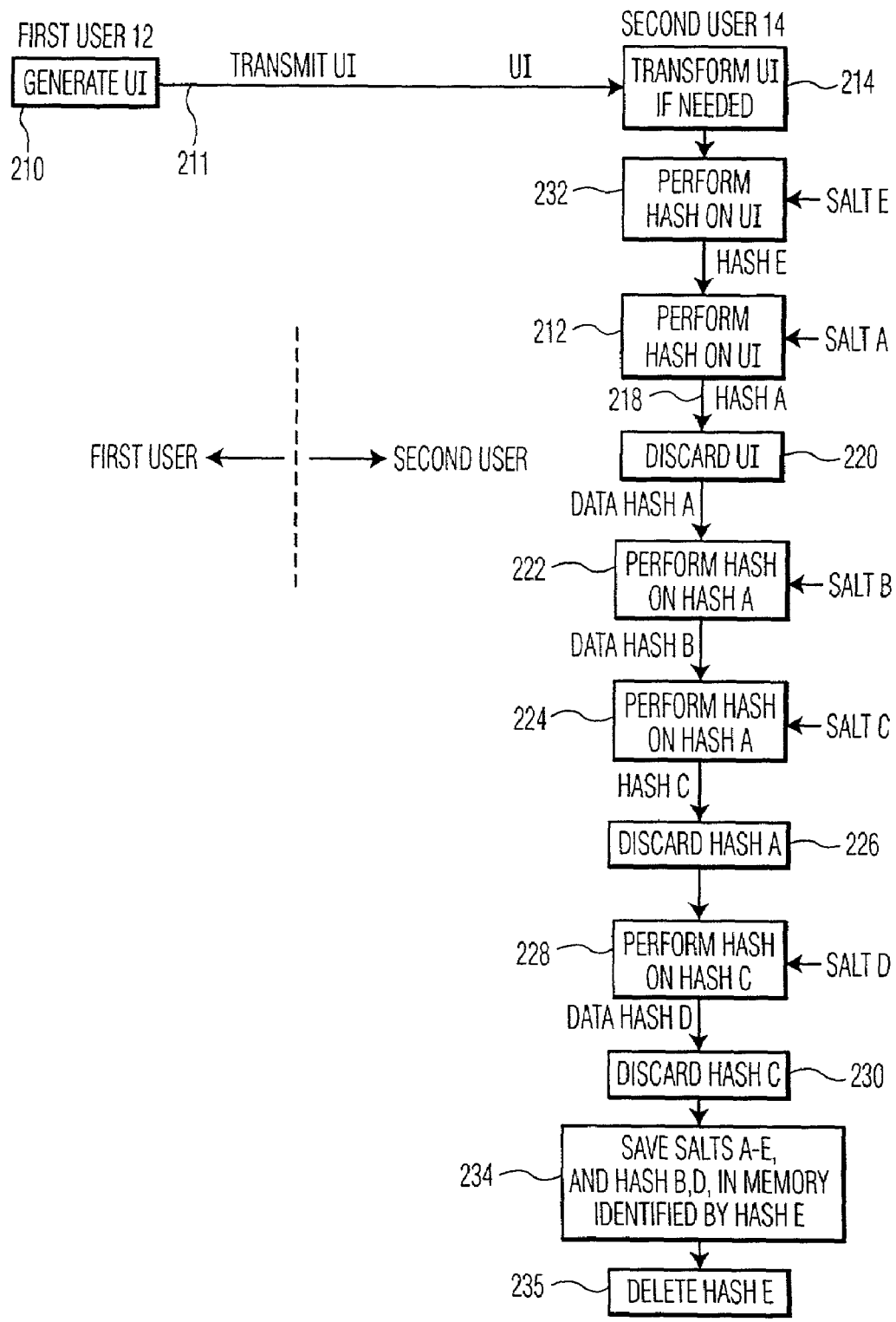
FIG. 2a is a simplified diagram illustrating the steps taken at the first and second of the users of FIG. 1 to perform an initial authentication of the first user to the second user.

FIG. 2a represents the processing performed by the first and second users 12 and 14 of FIG. 1 in an initial authentication process. In FIG. 2a, those steps performed at the first user are on the left, and those performed at the second user are at the right. In one application of the invention, this corresponds to an initial log-on or log-in process. More particularly, according to an aspect of the invention, the first user 12 generates and transmits to the second user 14 his user name and password, or any other unique identifier (UI), as suggested by block 210 of FIG. 2a and by transmission path 211. In addition, the first and second users 12, 14 must agree on a deterministic transformation of the unique identifier. This transformation may be no transformation at all, or it may be some selected portion, such as the first N bits, or every other tenth bit, or the like. Alternatively, it may be a one-to-one word transformation. In addition to the agreement on the deterministic transformation, agreement must be reached on the identities of five hash salts, which may be designated as A, B, C, D, and E. These are strings of numbers on which the parties agree. The agreement may be reached automatically, as by inclusion of the information in the software which implements the invention for the users. As an alternative, of course, the agreement could be reached in some other way, as by telephone communication between the parties. However accomplished, the unique identifier is transmitted from the first user 12 to the second user 14, and the second user 14 then has available not only the unique identifier, but also has the five hash salts, and knows the hash technique(s) to be used and the appropriate transformation of the unique identifier.

Once the unique identifier (UI) has been transmitted to the second user 14 as suggested by path 211 of FIG. 2a, the second user 14 begins to operate on the information. If a deterministic transformation of the unique identifier has been agreed to, that transformation is done first, as suggested by block 214 of FIG. 2a. Block 232 represents the performing of a hash operation on the unique identifier (UI), using agreed-upon salt E, to produce data hash E. The second user then, in block 212, performs a hash operation on the unique identifier (or its deterministic transformation, as appropriate), using the first hash salt (salt A) which was agreed to, to thereby produce a first data hash, which may be termed "data hash A." Once data hashes A and E have been generated, the logic or method flows from block 212 by way of logic path 218 to a block 220. Block 220 represents the discarding of the unique identifier (UI), so that the UI resides for the least possible time in the second user's processor (14 of FIG. 1) and is therefore less available to be hacked. The next block of FIG. 2a, namely block 222, represents the performing of a hash operation on data hash A, using the second agreed-to salt, designated "salt B," to thereby produce another data hash, designated "data hash B." Block 224 of FIG. 2a represents the performing of a further hash operation on data hash B using the third agreed-upon salt, designated "salt C," to thereby generate a data hash designated "C." At this point in the calculations, there is no longer any need for data hash A, and it can be discarded, as represented by block 226.

Block 228 of FIG. 2a represents the performing, by the second user 14, of a hash operation on data hash C using agreed-upon salt D. This results in a hash designated as "data hash D". Following this step, block 230 represents the discarding of data hash C. Block 234 of FIG. 2a represents the saving in memory of data hashes B and D at addresses controlled or established by data hash E (or some derivative of data hash E). If the salts A through E are not specified by the software, the salts may also be stored in memory. Following this step, data hash E may be discarded, as suggested by block 235. This completes the initial authorization portion of the process.

Figure 2B:
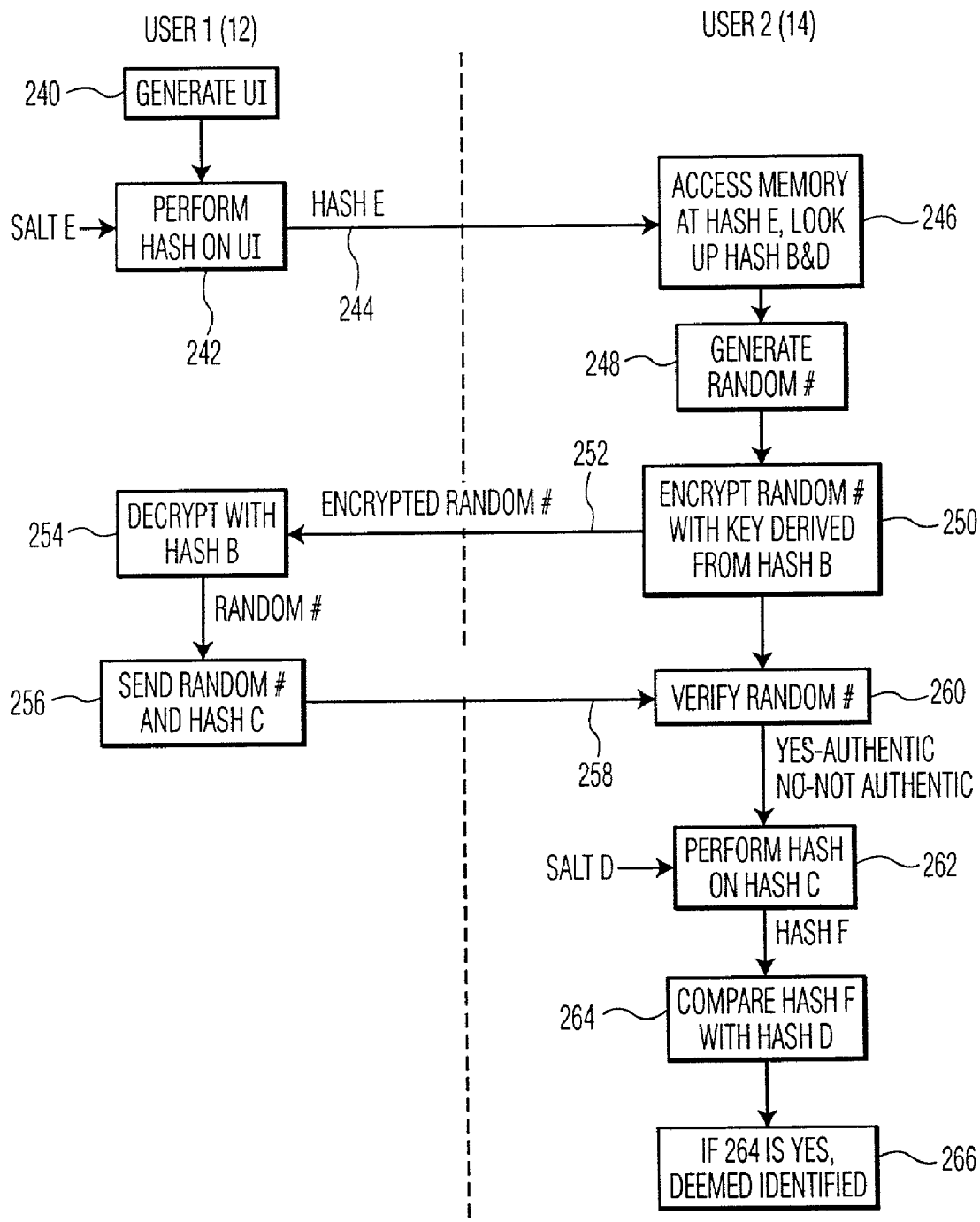
FIG. 2b is a simplified diagram illustrating the steps taken at the first and second users of FIG. 1 to log the first user onto the second user after the initial authentication.

FIG. 2b represents the "other" half of the authentication process, corresponding, in one application of the invention, to a later log-in by the first user 12 to second user 14. In FIG. 2b, the second user 12 generates his unique identifier (UI), as for example by having the user type it onto the keyboard of his computer, as suggested by block 240. The software associated with or implementing the processing according to an aspect of the invention then performs block 242, which represents the performing of a hash on the unique identifier using salt E, which results in generation of data hash E. Assuming that the unique identifier was the same as the one originally produced, data hash E should be identical to that previously generated by second user 14 at the initial set-up. As noted above, data hash E was never explicitly stored by second user 14, but was instead implicit in the memory addresses selected for storing data hashes B and D during the operations associated with FIG. 1a. Data hash E is transmitted from first user 12 to second user 14, as suggested by path 244 of FIG. 2a, whereupon the second user 14 has an explicit version of data hash E. Block 246 represents the addressing of memory with data hash E (or something derived therefrom) at the second user 14, to access data hashes B and D. If the unique identifier entered in block 240 was correct, the memory should return the same data hashes B and D that were initially stored therein. Block 248 represents the generation at the second user 14 of a random number with which first user 12 will be "challenged." The random number is encrypted in block 250 with an encryption key derived from hash B. The purpose of the encryption is not necessarily to protect the random number from interception on its way back to first user 12, but is instead to find out if the person or user currently trying to access second user 14 is in possession of the hash B, to thereby at least partially authenticate the first user A. The encrypted random number is transmitted to the first user 12, as suggested by path 252.

In order to continue with the process of FIG. 2b, certain hashes are required at first user 12. These hashes can be generated by user 1 during the initial authorization described in conjunction with FIG. 2a, or they may be performed by the first user 12 during the processes described in conjunction with FIG. 2b. In any event, the generation of the various hashes B and C at first user 12 in FIG. 2b follows steps corresponding to at least blocks 212, 222, and 224 of FIG. 2a.

At the first user 12, the encrypted random number received from second user 14 is decrypted with data hash B, to recover the random number, as suggested by block 254 of FIG. 2a. The random number is transmitted in unencrypted form from the first user 12 back to the second user 14, together with data hash C. The purpose of sending data hash C together with the random number is to authenticate the data hash C which is being transmitted, since only the authentic first user 12 would have data hash B, and so only the authentic user could decrypt the random number. Thus, data hash C is transmitted to second user 14 together with the decrypted random number, as suggested by path 258 of FIG. 2b.

When the decrypted random number is received at the second user 14 together with data hash C, the second user 14 verifies the random number, as suggested by block 260 of FIG. 2b, by comparison with the random number originally sent. Assuming that the random number is authenticated, the data hash C is deemed to be authentic, and the logon process proceeds to block 262. Block 262 represents the performing of a hash operation on data hash C using salt D. Since these are presumably the same as those associated with block 228 of FIG. 2a, they result in a data hash F, which should be identical to data hash D. Block 264 represents the comparison of data hashes D and F. If they are the same, first user 12 is deemed to be the same party that initially was set up or authenticated as suggested by block 266. The channel is then maintained open, or other suitable action is taken consistent with log-in authentication of the first user. Failure of the process at any step results in a "not authenticated" result.

Ideally, the authentication process would be performed over a secure channel, such as a secure tunnel or virtual private network (VPN) in the context of an Internet connection, but this is not necessary to the invention.

The salient advantage of the described system is that, even if the second user's computer or server containing data hashes B and D is compromised, the hacker has not obtained sufficient information to impersonate first user 12. In particular, the hacker does not have the unique identifier, which is needed in order to generate data hash C. In order to authenticate himself to second user 14, a putative user must have data hashes B, C, and E. The putative user must have data hash B in order to decrypt the random number. He must also supply data hash C to the second user 14. Unauthorized access to the computer or server of second user 14 can provide only data hashes B and D, and that only if he already has data hash E. Data hash E is mandatory for accessing data hashes B and D in second user 14's server, and so a hacker, even gaining access to the second user's server, cannot determine any one of data hashes A (which is not stored), B (stored in memory but not identifiable), C (which is not stored), D (stored in memory but not identifiable), or E (which is not explicitly stored). Thus, in principle, unauthorized access to the second user's server cannot enable a hacker to impersonate first user 12.

Other embodiments of the invention will be apparent to those skilled in the art. For example, different hashing operations may be used during the course of a single authentication or log-in, and agreement on the type of hashing operation, and when it is used, must also be agreed upon and stored by both or all parties, or inherent in the software. The processes of the invention may be performed in software, hardware or firmware. Processing may be in digital serial or parallel form. While the network illustrated and described in FIG. 1 is the Internet, other networks may be used, such as a local area network (LAN).

Thus, a method according to an aspect of the invention provides for identification between or among at least first (12) and second (14) users communicating by means of a communication system (16) or network. The method includes the step (210, 211) of providing a first unique identifier from the first user (12) to the second user (14). This unique identifier may be a user name and password, or it may be any alphanumeric which the first user (12) selects or adopts. At least the first and second users (12, 14) enter into an agreement as to a plurality of hash or hashing salts. In one embodiment of the invention, the agreement provides for five hash salts (salts A, B, C, D, and E). There need not be an explicit agreement on the hash salts, as software which each of the parties uses to implement the invention may be preprogrammed with specific salts, or with some way to reach agreement. However determined, at least five salts are agreed to between or among the parties, as well as the type or types of hash operations to be used. At the second (14) user, a hash operation (212) is performed on one of (a) the first unique identifier (UI) and (b) an agreed-upon deterministic transformation of the first unique identifier (214), using the first (A) salt from the plurality of salts which was agreed to, to thereby produce a first (A) data hash. Data hashing is a well-known technique, and any conventional hashing technique can be used. In this context, a deterministic transformation includes a defined subset of the unique identifier, or the result of application of the unique identifier to some defined equation; ultimately, the only requirement is that each of the first and second users must be able to perform the same operation to reach the same result. At the second user (14), a hash operation (232) is performed on the unique identifier, or its transformation, using the fifth (E) of the hash salts, to thereby produce a fifth (E) data hash. At the second user (14), a hash operation (222) is performed on at least a portion of the first (A) data hash using the second (B) of the plurality of hash salts, to thereby produce a second (B) data hash. The second user (14) proceeds to perform a hash operation (224) on at least a portion of the first (A) data hash, using the third (C) of the plurality of hash salts, to thereby produce a third (C) data hash. At the second user (14), a hash operation (228) is performed on at least a portion of the third (C) data hash using the fourth (D) of the plurality of hash salts, to thereby produce a fourth (D) data hash. At the second user (14), the third (C) data hash is discarded (230). Data hashes B and D are stored (234) in memory at the second user (14)'s location or site, at addresses pointed to by hash E. At this point in the operation, the second user (14) has in its memory data hashes B and D, but hash E is not explicitly stored. The second user may also store the various salts, and the types of hashing operations. Ideally, the second user also discards (220) the unique identifier (UI). This completes the initial authentication process, where (in which) the first user (12) identifies himself to the second user (14), so that the second user (14) can later recognize the first user (12) at the later actual log-in to the second user (14). The later log-in includes, at the first user (12), performing a hash operation (242), using the fifth one (E) of the plurality of hash salts, on at least a portion of one of (a) the first unique identifier and (b) data deterministically derived from the unique identifier, to thereby produce (a replica of) the fifth (E) data hash; this step may be performed as part of the initial authentication or as part of each log-in. To start the first log-in, the first user (12) keys in his unique identifier, which as mentioned may be a user name and password. The first user (12) uses salt E to perform a hash operation on the unique identifier or its derivative (if not already performed), to thereby produce data hash E. Data hash E is transmitted (244) to the second user (14). It should be noted that it is not possible to determine the unique identifier from only hash salt E and data hash E. The second user (14), when it receives data hash E, acts on it as initiating a log-in. and accesses its memory (246) at the locations specified by data hash C, to recover data hashes B and D, which are associated with the first user (12). The second user (14) then generates (248) a random number, and encrypts (250) the random number in any conventional way with a key deterministically derived from data hash B. The encrypted random number is sent over the communication path or network (252) to challenge the first user (12). The first user (12) then proves that he is in possession of data hash B by decrypting the encrypted random number (254) using its own copy (or reconstruction) of hash B, to thereby form an extracted random number. Having the random number, then, proves that the user attempting to log on has data hash B, which only the original entity (user A) which authenticated itself can have. Data hash C is transmitted (256) from the first user (12) to the second user (14) (by way of path 258) together with the extracted random number for authentication of data hash C (258). The second user (14) compares the original random number with the returned random number (260), and deems the transmission authentic if they match. At this point, the second user (14) once again has possession of data hash C, as well as data hashes B and D. The second user (14) then performs a hash operation (262) on the third (C) data hash using the fourth (D) hash salt, which generates a sixth (F) data hash, which should be equal or identical to the fourth (D) data hash if all goes well. Naturally, if there is any deviation among the various numbers, the third (C) and sixth (F) data hashes will not be the same as during the initial authentication. The second user (14) then compares (264) the fourth (D) and sixth (F) data hashes, to determine if they are equal. If they are equal, the second user (14) deems the message (266) to be from the first user (12), and enables the connection or communication between the users (12, 14) in any conventional manner. The second user (14) then discards the third (C) data hash, so that it cannot be compromised.

In one variant of the method of the invention, after the steps at said second user (14) of (a) performing a hash operation (212) on one of (a) the first unique identifier (UI) and (b) an agreed-upon deterministic transformation of the first unique identifier (214), using the first (A) salt, to thereby produce a first (A) data hash and (b) performing a hash operation (232) on the unique identifier, or its transformation, using the fifth (E) of the hash salts, to thereby produce a fifth (E) data hash, a further step (220) of discarding the first unique identifier is performed at the second user (14).

What is claimed is:

1. A method for identification among at least first and second users communicating by means of a communication system, said method comprising the steps of:
   providing a first unique identifier from said first user to said second user;
   entering into an agreement between at least said first and second users as to a first plurality of hash salts;
   at said second user, performing a hash operation on one of (a) said first unique identifier and (b) a deterministic transformation of said first unique identifier, using a first hash salt from said plurality of hash salts, to thereby produce a first data hash (A);
   at said second user, performing a hash operation on at least a portion of said first data hash (A) using a second of said plurality of hash salts (B), to thereby produce a second data hash (B);
   at said second user, performing a hash operation on at least a portion of said first data hash (A) using a third of said plurality of hash salts (C), to thereby produce a third data hash (C);
   at said second user, performing a hash operation on at least a portion of said third data hash (C) using a forth of said plurality of hash salts (D), to thereby produce a fourth data hash (D);
   at said second user, discarding said third data hash (C);
   at said second user, performing a hash operation, using a further one of said plurality of hash salts (E), on at least a portion of one of (a) said first unique identifier and (b)

data deterministically derived from said unique identifier, to thereby produce a fifth data hash (E);

at said second user, generating a random number;

at said second user, encrypting said random number with a key which includes at least a deterministic transformation of said second data hash, to produce an encrypted random number, where said transformation is agreed to ahead of time;

at said first user, decrypting said encrypted random number using as a key, said at least a deterministic transformation of said second data hash, to extract said random number, to thereby form an extracted random number;

at said first user, transmitting to said second user both said extracted random number and said third data hash;

at said second user, performing a hash operation on said third data hash by the use of said forth hash salt, to thereby generate a sixth data hash (F);

at said second user, comparing said fourth and sixth data hashes, and deeming said message to be from said first user; and at said second user, discarding said third data hash.

2. A method according to claim 1, further comprising, after said steps, at said second user, (a) performing a hash operation on one of (a) said first unique identifier and (b) a deterministic transformation of said first unique identifier, using a first hash salt from said plurality of hash salts, to thereby produce a first data hash (A) and (b) performing a hash operation, using a further one of said plurality of hash salts (E), on at least a portion of one of (a) said first unique identifier and (b) data deterministically derived from said unique identifier, to thereby produce a fifth data hash (E), the step of:

discarding said first unique identifier.

3. A method for identification among at least first and second users communicating by means of a communication system, said method comprising the steps of:

providing a first unique identifier from said first user to said second user, entering into an agreement between at least said first and second users as to a first plurality of hash salts;

at said second user, performing a hash operation on one of (a) said first unique identifier and (b) a deterministic transformation of said first unique identifier, using a first hash salt from said plurality of hash salts, to thereby produce a first data hash (A);

at said second user, performing a hash operation on at least a portion of said first data hash (A) using a second of said plurality of hash salts (B), to thereby produce a second data hash (B);

at said second user, performing a hash operation on at least a portion of said first data hash (A) using a third of said plurality of hash salts (C), to thereby produce a third data hash (C);

at said second user, performing a hash operation on at least a portion of said third data hash (C) using a forth of said plurality of hash salts (D), to thereby produce a fourth data hash (D);

at said second user, discarding said third data hash (C);

at said second user, performing a hash operation, using a fifth one of said plurality of hash salts (E), on at least a portion of one of (a) said first unique identifier and (b) data deterministically derived from said unique identifier, to thereby produce a fifth data hash (E);

at said second user, storing said second and fourth data hashes in memory at locations established by said fifth data hash;

at said first user, performing a hash operation on at least a portion of one of (a) said first unique identifier and (b) data deterministically derived from said unique identifier, using said fifth data hash, to thereby produce a replica of said fifth data hash;

transmitting said replica of said fifth data hash from said first user to said second user;

at said second user, accessing said memory at locations established by said replica of said fifth data hash to obtain said second and fourth data hashes;

at said second user, generating a random number;

at said second user, encrypting said random number with a key which includes one of (a) said second data hash and (b) a deterministic transformation of said second data hash, to produce an encrypted random number, where said transformation is agreed to ahead of time;

at said first user, decrypting said encrypted random number using as a key, one of (a) said second data hash and (b) a deterministic transformation of said second data hash, to extract said random number, to thereby form an extracted random number;

transmitting from said first user to said second user both said extracted random number and said third data hash;

at said second user, performing a hash operation on said third data hash by the use of said forth hash salt, to thereby generate a sixth data hash (F);

at said second user, comparing said fourth and sixth data hashes, and deeming said message to be from said first user if they are identical; and at said second user, discarding said third data hash.

4. A method according to claim 3, further comprising, after said step of, at said second user, storing said second and fourth data hashes in memory at locations established by said fifth data hash, the step of:

discarding said fifth data hash.

* * * * *